United States Patent Office 3,051,682
Patented Aug. 28, 1962

3,051,682
SUSPENSION POLYMERIZATION OF VINYLIDENE AROMATIC COMPOUNDS
John B. Ott, Northampton, Mass., assignor to Monsanto Chemical Company, St. Louis, Mo., a corporation of Delaware
No Drawing. Filed Oct. 1, 1958, Ser. No. 764,528
7 Claims. (Cl. 260—45.5)

The present invention relates to the polymerization of vinylidene aromatic compounds such as styrene. More particularly, the present invention relates to the preparation of homopolymers and interpolymers of vinylidene aromatic compounds in granular form.

One of the important industrial processes for polymerizing vinylidene monomers containing the $CH_2=C<$ grouping is the so-called suspension polymerization process. In this process, the monomers and free radical generating polymerization initiator are stirred vigorously in a large volume of water to disperse the monomers throughout the water in the form of small droplets. The polymerization takes place within the monomer droplets and the large volume of water surrounding the droplets serves to remove the heat liberated in the reaction. From the viewpoint of good heat transfer and the concomitant close control of the polymerization, the suspension polymerization process is recognized as being nearly an ideal process. In virtually all cases, however, the dispersion of vinylidene monomer in water is not stable in the absence of dispersing or stabilizing agents.

Not withstanding the recognized attractive features of suspension polymerization processes, there are difficulties encountered in employing such processes in the polymerization of vinylidene aromatic compounds such as styrene. In part at least these shortcomings are due to the difficulty of finding truly satisfactory dispersing agents for these systems. Many of the dispersing agents that have been suggested previously have been subject to certain difficulties. For example, many of the dispersing agents do not give granules of the desired small size. With ionic dispersing agents, a serious problem arises in the removal of the dispersing agent from the polymeric material. Certain dispersing agents are undesirable in that they detract from the stability of the polymeric product. Other dispersing agents are undesirable in that they are occluded in the polymer and impart a haze thereto.

It is an object of this invention to provide a novel process for the suspension polymerization of vinylidene aromatic compounds.

Another object of this invention is to provide a process for the suspension polymerization of vinylidene aromatic compounds in which novel dispersing agents are employed.

These and other objects and advantages of this invention will become apparent from the following detailed description thereof.

In accordance with the present invention there is provided an improved polymerization process in which a vinylidene aromatic monomer of the group consisting of a monovinylidene aromatic hydrocarbon monomer, a ring-halogenated monovinylidene aromatic hydrocarbon monomer and mixtures thereof is dispersed and polymerized in a dilute aqueous solution of a water-soluble interpolymer of monomers consisting solely of an acidic monomer of the group consisting of acrylic acid, methacrylic acid and mixtures thereof and an ester monomer of the group consisting of an alkyl acrylate, an alkyl methacrylate and mixture thereof in which the alkyl group contains 6–18 carbon atoms. The process of the present invention is applicable to the homopolymerization and the interpolymerization of a wide variety of vinylidene aromatic monomers as subsequently set forth in greater detail and is particularly advantageous when applied to the preparation of high impact polymers prepared by dissolving a rubbery diene polymer in the vinylidene aromatic monomer before effecting polymerization thereof.

The following examples are set forth to illustrate more clearly the principle and practice of this invention to those skilled in the art. All parts are by weight.

EXAMPLE I

Into a glass-lined, stirred reaction vessel are charged 200 parts of freshly distilled water and 0.1 part of a water-soluble interpolymer consisting of 95.5 mol percent of acrylic acid and 4.5 mol percent of 2-ethylhexyl acrylate. The atmosphere in the reaction vessel is swept free of oxygen with nitrogen and thereafter 100 parts of styrene and 0.1 part benzoyl peroxide are charged to the reaction vessel. The reaction mixture is stirred and heated for 6 hours at 90° C. and then 8 hours at 130° C. The product is obtained in essentially quantitative yield in the form of small spherical beads having an average diameter of less than about 3 mm.

The acrylic acid-2-ethylhexyl acrylate interpolymer employed as a dispersing agent in this example has a specific viscosity of 4.0 as determined in a 1% solution in water at 25° C. Throughout this description, unless otherwise noted, it will be understood that all specific viscosity value reported are determined under these conditions.

EXAMPLE II

One hundred parts of styrene monomer and 0.1 part lauroyl peroxide are charged to the reaction vessel described in Example I. After sweeping the reaction atmosphere free of oxygen with nitrogen, the styrene monomer is heated to 60° C. with stirring until approximately 30% of the styrene is converted into polystyrene. At this point, 200 parts of water containing 0.1 part of the acrylic acid-2-ethylhexyl acrylate interpolymer described in Example I are charged to the reaction vessel. Thereafter, the reaction vessel is heated for 8 hours at 60–80° C. with stirring. The polystyrene is obtained in the form of small beads essentially similar to the product obtained in Example I.

EXAMPLE III

Example II is repeated except that the monomers charged to the reaction consist of 75 parts of styrene and 25 parts of alpha-methylstyrene. Comparable results are obtained.

EXAMPLE IV

Ten parts of an interpolymer containing equal weight percentages of butadiene and styrene are dissolved in 90 parts of styrene monomer together with 0.05 part ditertiary butyl peroxide and 0.1 part of dodecyl mercaptan. This monomer mixture is then polymerized following the procedure described in Example II. The product is obtained in substantially quantitative yield and in the form of small discrete beads having an average particle size of less than about 3 mm.

EXAMPLE V

Sixty-nine parts of styrene monomer, 31 parts of acrylonitrile monomer, 0.2 part of dispersing agent, 0.6 part of dodecyl mercaptan and 180 parts of water are charged to the reaction vessel described in Example I. The dispersing agent employed contains 95.5 mol percent of acrylic acid and 4.5 mol percent of 2-ethylhexyl acrylate and has a specific viscosity of 2.6. The reaction mixture is heated for 9 hours at 70° C. with agitation. The interpolymer of styrene and acrylonitrile is obtained in the form of fine, uniform size beads having an average particle size of less than about 3 mm.

EXAMPLES VI–IX

The effect of varying molecular proportions on the efficiency of interpolymers of acrylic acid and 2-ethylhexyl acrylate as suspending agents is illustrated in these examples. In each case, the polymerizable mixture charged to the reaction is a partially polymerized product obtained by dissolving 6 parts of an interpolymer containing equal percentages of styrene and butadiene in 94 parts of styrene monomer together with 0.3 part of benzoyl peroxide and polymerizing the resulting mixture to 22% solids. The suspension polymerizations are carried out by dispersing 100 parts of the partially polymerized mixture throughout 200 parts of the aqueous medium for 16 hours at 95° C. The molar composition of the interpolymer dispersing agents and the concentrations thereof employed are set forth in Table I. In each case the polymer is obtained in the form of small uniform beads having an average particle size of less than about 3 mm.

*Table I*

| Example | Dispersing Agent | | Specific Viscosity Suspending Agent [1] | Concentration Dispersing Agent, Wt. percent on polymer |
|---|---|---|---|---|
| | Mol percent Acrylic Acid | Mol percent 2-Ethylhexyl Acrylate | | |
| VI | 97.0 | 3.0 | 4.4 | 0.1 |
| VII | 94.0 | 6.0 | 4.3 | 0.3 |
| VIII | 94.0 | 6.0 | 4.3 | 0.5 |
| IX | 95.5 | 4.5 | 7.6 | 0.3 |

[1] Determined in 1% solution in water @ 25° C.

EXAMPLE X

Three polymerizations are run employing the procedure of Example IX except for two minor variations. The concentration of the dispersing agent is reduced to 0.2% on the monomers and there is added to the aqueous phase in each polymerization run, respectively, 0.001%, 0.01% and 0.1% sodium chloride. In each case the polymer is obtained in the form of small uniform beads having an average particle size of less than about 3 mm.

EXAMPLE XI

Example X is repeated except that the sodium chloride employed therein is replaced with calcium chloride. Comparable results are obtained.

EXAMPLE XII

PART A

Several polymerizations are run following the procedure of Example IX except that sufficient sodium hydroxide is added to the aqueous dispersing medium to raise its pH to, respectively, 4.0, 5.0, 6.0 and 7.0. In each case the polymer is obtained in the form of small uniform size beads having an average particle size of less than about 3 mm.

PART B

The polymerization run at pH 6.0 of Part A above is repeated except that 0.1% of sodium chloride is included in the aqueous dispersing medium. Comparable results are obtained.

PART C

The polymerization run at pH 5.0 of Part A above is repeated except that 0.05% of calcium chloride is included in the aqueous dispersing medium. Essentially comparable results are obtained.

EXAMPLE XIII

The polymerization of Example IX is repeated except that a small quantity of sulfuric acid is added to the aqueous dispersing medium to lower its pH to 2. The product is obtained in the form of small beads having a more uniform size than the beads obtained in Example IX.

EXAMPLE XIV

Three polymerizations are run employing interpolymers of 95.5 mol percent of acrylic acid and 4.5 mol percent 2-ethylhexyl acrylate as the dispersing agents. The specific viscosities of the interpolymers are, respectively, 2.8, 4.7 and 8.8 to illustrate the effect of variation in molecular weight upon the efficiency of the dispersing agent.

In each polymerization 100 parts of partially polymerized mixture are charged to 120 parts of water containing 0.15% of the suspending agent and 0.1% of calcium chloride. The partially polymerized mixture employed is obtained by dispersing 6 parts of a polymer containing equal weight percentages of styrene and butadiene in 94 parts of styrene monomer together with 0.1% benzoyl peroxide and polymerizing the mixture to 30% solids.

The suspension polymerization is carried out by dispersing the partially polymerized mixture throughout the aqueous medium for 7 hours in 130° C. In each case the polymer product is obtained in the form of small uniform beads having an average particle size of less than about 3 mm.

EXAMPLE XV–XIX

The effect of the molar proportions contained in an acrylic acid 2-ethylhexyl acrylate interpolymer on the efficiency of the interpolymer as a suspending agent is illustrated by carrying out several polymerizations by the procedure of Example XIV. In each case the product is obtained in the form of beads having an average particle size of less than about 3 mm. The molar composition of the interpolymers employed and the specific viscosities thereof are set forth in Table II.

*Table II*

| Example | Suspending Agent Composition | | Specific Viscosity of Suspending Agent [1] |
|---|---|---|---|
| | Mol Percent Acrylic acid | Mol Percent 2-Ethylhexyl Acrylate | |
| XV | 98.5 | 1.5 | 4.1 |
| XVI | 97.5 | 2.5 | 4.1 |
| XVII | 97.0 | 3.0 | 3.3 |
| XVIII | 96.0 | 4.0 | 4.4 |
| XIX | 94.5 | 5.5 | 5.3 |

[1] Determined in 1% solution in water @ 25° C.

EXAMPLE XX

Example XIV is repeated except that the dispersing agent employed is an interpolymer consisting of 95.5 mol percent of acrylic acid and 4.5 mol percent of 2-ethylhexyl methacrylate and having a specific viscosity of approximately 4.0. Comparable results are obtained.

EXAMPLE XXI

Example XIV is repeated except that the dispersing agent employed is an interpolymer consisting of 95.5 mol percent of methacrylic acid and 4.5 mol percent of 2-ethylhexyl acrylate and having a specific viscosity of approximately 0.2. Essentially similar results are obtained.

EXAMPLE XXII

Example XIV is repeated except that the suspending agent employed is an interpolymer consisting of 98.5 mol percent of methacrylic acid and 1.5 mol percent of 2-ethylhexyl methacrylate and having a specific viscosity of approximately 0.3. The polymer is obtained in the form of small beads having an average particle size of less than about 3 mm.

EXAMPLES XXIII–XXX

A series of 8 polymerizations are run employing the procedure set forth in Example XIV except that the suspending agents employed are interpolymers of acrylic acid and various alkyl esters of acrylic acid as set forth in Table III. In each case the polymer is obtained in the form of small beads having an average particle size of less than about 3 mm.

*Table III*

| Example | Suspending Agent Composition | | | Specific Viscosity of Suspending Agent [1] |
|---|---|---|---|---|
| | Mol Percent Acrylic Acid | Acrylate Ester | Mol Percent Acrylate Ester | |
| XXIII | 90 | 2-Ethylbutyl Acrylate. | 10 | 5.5 |
| XXIV | 94 | n-Hexyl Acrylate | 6 | 4.5 |
| XXV | 91 | ___do___ | 9 | 4.0 |
| XXVI | 97 | n-Octyl Acrylate | 3 | 5.5 |
| XXVII | 94 | ___do___ | 6 | 5.5 |
| XXVIII | 99 | n-Dodecyl Acrylate | 1 | 6.1 |
| XXIX | 97 | ___do___ | 3 | 6.1 |
| XXX | 99 | n-Octadecyl Acrylate | 1 | 3.0 |

[1] Determined in 1% solution in water @ 25° C.

The dispersing agents employed in the practice of the present invention are water-soluble interpolymers of monomers consisting solely of an acidic monomer of the group consisting of acrylic acid, methacrylic acid and mixtures thereof and an ester monomer of the group consisting of an alkyl acrylate, an alkyl methacrylate and mixtures thereof in which the alkyl group contains 6–18 carbon atoms. For purposes of this invention the interpolymers are considered to be water-soluble if 0.5 part of the interpolymer will dissolve in 99.5 parts of water at 25° C. For reasons of both cost and performance it is preferred to employ interpolymers in which the alkyl group present in the ester monomer contains 6–12 carbon atoms.

The molar composition of the water-soluble interpolymers will depend upon both the acidic monomer included therein and the number of carbon atoms contained in the alkyl group of the ester monomer. When acrylic acid is employed as the acidic monomer, the interpolymer will contain (a) 5–15 mol percent of the ester monomer when its alkyl group contains 6–7 carbon atoms, (b) 1.5–8 mol percent of the ester monomer when its alkyl group contains 8–9 carbon atoms, (c) 1–7 mol percent of the ester monomer when its alkyl group contains 10–11 carbon atoms, (d) 1–6 mol percent of the ester monomer when its alkyl group contains 12–15 carbon atoms and (e) 0.5–2.5 mol percent of the ester monomer when its alkyl group contains 16–18 carbon atoms. When methacrylic acid is employed as the acidic monomer, the interpolymer will contain (a) 1–10 mol percent of the ester monomer when its alkyl group contains 6–7 carbon atoms, (b) 0.5–5.0 mol percent of the ester monomer when its alkyl group contains 8–9 carbon atoms, (c) 0.5–2.0 mol percent of the ester monomer when its alkyl group contains 10–11 carbon atoms, (d) 0.3–1.5 mol percent of the ester monomer when its alkyl group contains 12–15 carbon atoms and (e) 0.1–1.0 mol percent of the ester monomer when its alkyl group contains 16–18 carbon atoms.

The reason that the limits on the molar proportions of the two monomer types that may be included in the water-soluble interpolymer vary, depending upon whether acrylic acid or methacrylic acid is included therein, is the fact that methacrylic acid is more hydrophobic than acrylic acid. Accordingly, if a mixture of acrylic acid and methacrylic acid is included in the interpolymer, the limits on the proportions of the two monomer types included in the interpolymer will be intermediate between those set forth above for interpolymers containing either acrylic acid or methacrylic acid as the sole acidic monomer. As a specific example, if a mixture of equal mol proportions of acrylic acid and methacrylic acid is included in the interpolymer with an octyl acrylate, the interpolymer should contain 1.0–6.5 mol percent of the octyl acrylate.

By letting $n$ represent the mol fraction of acrylic acid included in the acidic monomer component of the interpolymer, the lower limit of the ester monomer that can be employed may be restated as (a) $1+4n$ mol percent when the alkyl group of the ester monomer contains 6–7 carbon atoms, (b) $0.5+1n$ mol percent when the alkyl group of the ester monomer contains 8–9 carbon atoms, (c) $0.5+0.5n$ mol percent when the alkyl group of the ester monomer contains 10–11 carbon atoms, (d) $0.3+0.7n$ mol percent when the alkyl group of the ester monomer contains 12–15 carbon atoms, and (e) $0.1+0.4n$ mol percent when the alkyl group of the ester monomer contains 16–18 carbon atoms. The maximum quantity of the ester monomer that can be included in the interpolymer will be (f) $10+5n$ mol percent when the alkyl group of the ester monomer contains 6–7 carbon atoms, (g) $5+3n$ mol percent when the alkyl group of the ester monomer contains 8–9 carbon atoms, (h) $2+5n$ mol percent when the alkyl group of the ester monomer contains 10–11 carbon atoms, (i) $1.5+4.5n$ mol percent when the alkyl group of the ester monomer contains 12–15 carbon atoms, and (j) $1+1.5n$ mol percent when the alkyl group of the ester monomer contains 16–18 carbon atoms. In all the above formulas, $n$ is numerically equal to the mol percent of acrylic acid included in the interpolymer divided by the sum of the mol percent of acrylic acid plus the mol percent of methacrylic acid included in the interpolymer.

In the most preferred embodiment of the invention, the water soluble interpolymer will consist of 95.0–98.0 mol percent of acrylic acid and, correspondingly, 5.0–2.0 mol percent of an octyl acrylate and especially 2-ethylhexyl acrylate.

As established in Example XIV, the dispersing action of the interpolymers is affected but slightly by wide variations in molecular weight. The preferred dispersing agents have specific viscosities of at least about 0.1 when methacrylic acid is the acidic monomer included in the interpolymer and at least about 0.8 when acrylic acid is the acidic monomer included in the interpolymer. Both of the above noted specific viscosity values are determined in 1% solutions in water at 25° C. in accordance with the well-known formula:

$$\text{Specific viscosity} = \frac{\text{Solution viscosity} - \text{solvent viscosity}}{\text{Solvent viscosity}}$$

The preferred method for preparing the dispersing agents employed in the present invention comprises dissolving an appropriate monomer mixture and a free radical generating polymerization initiator in an organic liquid which is a solvent for the monomer mixture but a non-solvent for the interpolymer prepared therefrom and heating to effect polymerization.

A desirable feature of the present invention is that the dispersing agents employed are stable in aqueous solutions for long periods of time. Thus, in commercial practice, the dispersing agent will be dissolved in water to prepare large volumes of dispersing agent solution which can be stored and used as needed.

Usually only a small concentration of the dispersing agent of this invention is necessary, e.g., 0.02–1.0% and more particularly 0.05–0.5% based upon the amount of water used is usually sufficient. The amount of dispersing agent to be used in any particular polymerization system depends upon a number of factors and by controlling the concentration of dispersing agent under a given set of polymerization conditions it is possible to obtain the polymer in a controlled desired particle size. Frequently, there is found to be an optimum amount of suspending agent to be employed for obtaining a minimum particle size and amounts of dispersing agent above or below this optimum amount produce polymers having a larger particle size. It is usually preferred to employ the smallest amount of dispersing agent that will produce polymers of the desired particle size.

In carrying out the polymerizations of the present invention it is usually preferred to maintain the pH of the aqueous dispersing medium below about 7.0. The dispersing agent contains carboxyl groups and, when employed at the preferred levels, will lower the pH of the aqueous dispersing medium to the approximate range of 3.0–4.0. Additional acid may be employed to lower the pH still further, e.g., to about 2.0 or even lower. In some cases it is desirable to include a small quantity of alkali, e.g., sodium hydroxide, in the aqueous dispersing medium.

The polymerization may be carried out by charging the monomers, polymerization initiator, water and dispersing agent to the system initially and heating and stirring the reaction mass. In one embodiment of the invention, however, the water, monomers and polymerization initiator are charged to the reaction vessel and the addition of the dispersing agent is delayed until the monomers have been polymerized to a conversion of the order of 20–30%. In still another embodiment of the invention the monomers are polymerized to a conversion of 20–30% before they are charged to the reaction vessel containing the water and dispersing agent. The polymerization initiators employed are normally free-radical generating initiators such as benzoyl peroxide, lauroyl peroxide, ditertiary butyl peroxide, oleyl peroxide, toluyl peroxide and the like.

If desired, additional components that are to be contained in the final polymeric product may be charged to the reaction vessel with the monomers. Typical examples of such additive materials are plasticizers, lubricants, antioxidants, stabilizers, colorants, etc. Where it is desired to prepare foamable beads of the vinylidene aromatic polymer by incorporating low-boiling organic liquids in the polymer these may be incorporated during the polymerization. A typical example of such materials that may be incorporated during the polymerization are low-boiling aliphatic hydrocarbons such as pentane, hexane, low-boiling petroleum ethers, etc. In general, it is preferred to delay adding such low-boiling foaming agents until the polymerization has been carried to a conversion of at least about 50%.

The process of the present invention may be employed in the homopolymerization of vinylidene aromatic monomers or the interpolymerization of such vinylidene aromatic monomers with themselves or other interpolymerizable vinylidene monomers. Examples of the vinylidene aromatic monomers that can be homopolymerized or interpolymerized include styrene, alpha-alkyl monovinylidene monoaromatic compounds, e.g., alpha-methylstyrene, alpha-ethylstyrene, alpha-methylvinyl toluene, alpha-methyl dialkylstyrenes, etc.; ring substituted alkyl styrenes, e.g., vinyl toluene, o-ethylstyrene, p-ethylstyrene, 2-4-dimethylstyrene, etc.; ring substituted halostyrenes, e.g., o-chlorostyrene, p-chlorostyrene, o-bromostyrene, 2,4-dichlorostyrene, etc.; ring alkyl-ring-halo-substituted styrenes, e.g., 2-chloro-4-methylstyrene, 2,6-dichloro-4-methylstyrene, etc.; vinyl naphthalene; vinyl anthracene; divinyl benzene; etc. Examples of the vinylidene monomers that can be interpolymerized with the vinylidene aromatic monomers include conjugated 1,3-dienes, e.g., butadiene, isoprene, etc., alpha, beta-unsaturated monobasic acids and derivatives thereof, e.g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, etc. Preferably, in the case of interpolymerization, a predominant proportion, i.e., more than 50% by weight, of the mixture of monomers is a vinylidene aromatic monomer and especially styrene. The invention is particularly adapted to the suspension polymerization of high impact polymers wherein a rubbery diene polymer such as natural rubber or a rubbery butadiene polymer is dissolved in a vinylidene aromatic monomer, especially styrene, and the vinylidene aromatic monomer is subsequently polymerized.

The above descriptions and particularly the examples are set forth by way of illustration only. Many other variations and modifications thereof will be apparent to those skilled in the art and can be made without departing from the spirit and scope of the invention herein described.

This application is a continuation-in-part of my copending application S.N. 573,074, filed March 26, 1956, now abandoned.

What is claimed is:

1. In a process for preparing granular polymerization products, the improvement which comprises polymerizing in aqueous dispersion a polymerizable material containing an aromatic monomer of the group consisting of a monovinylidene aromatic hydrocarbon, a ring-halogenated monovinylidene aromatic hydrocarbon, and mixtures thereof in the presence of a dispersing agent of the group consisting of:

(a) a water-soluble interpolymer containing from $1+4n$ to $10+5n$ mol percent of a combined ($C_6$–$C_7$ alkyl) ester, (b) a water-soluble interpolymer containing from $0.5+1n$ to $5+3n$ mol percent of a combined ($C_8$–$C_9$ alkyl) ester, (c) a water-soluble interpolymer containing from $0.5+0.5n$ to $2+5n$ mol percent of a combined ($C_{10}$–$C_{11}$ alkyl) ester, (d) a water-soluble interpolymer containing from $0.3+0.7n$ to $1.5+4.5n$ mol percent of a combined ($C_{12}$–$C_{15}$ alkyl) ester, and (e) a water-soluble interpolymer containing from $0.1+0.4n$ to $1+1.5n$ mol percent of a combined ($C_{16}$–$C_{18}$ alkyl) ester;

each of said alkyl esters being a member of the group consisting of an alkyl acrylate, an alkyl methacrylate, and mixtures thereof; the remainder of the composition of each of said water-soluble interpolymers being constituted by a combined acid of the group consisting of acrylic acid, methacrylic acid, and mixtures thereof; $n$ in the above formulas representing the mol fraction of acrylic acid included in the acidic component of the interpolymer.

2. In a process for preparing granular styrene polymers, the improvement which comprises polymerizing in aqueous dispersion a polymerizable material containing styrene monomer in the presence, as a dispersing agent, of a water-soluble interpolymer of monomers consisting solely of 92–98.5 mol percent of acrylic acid and, correspondingly, 8–1.5 mol percent of 2-etheylhexyl acrylate.

3. The process of claim 2 in which the styrene monomer is interpolymerized with acrylonitrile.

4. The process of claim 2 in which the styrene monomer is interpolymerized with alpha-methylstyrene.

5. The process of claim 2 in which a rubbery diene polymer is dissolved in the styrene monomer before the polymerization thereof.

6. The process of claim 5 in which the rubbery diene polymer employed is an interpolymer of butadiene and styrene.

7. The process of claim 2 in which the dispersing agent is a water-soluble interpolymer of 95.0–98.0 mol percent of acrylic acid and, correspondingly, 5.0–2.0 mol percent of 2-ethylhexyl acrylate.

References Cited in the file of this patent

UNITED STATES PATENTS

| | | |
|---|---|---|
| 2,300,566 | Hahn et al. | Nov. 3, 1942 |
| 2,322,309 | Morgan et al. | June 22, 1943 |
| 2,820,773 | Childers | Jan. 21, 1958 |
| 2,862,912 | Ott | Dec. 2, 1958 |